(12) United States Patent
Yamamoto et al.

(10) Patent No.: US 10,859,995 B2
(45) Date of Patent: Dec. 8, 2020

(54) CONTROLLER FOR MACHINE TOOL (71) Applicant: FANUC CORPORATION, Yamanashi (JP)

(72) Inventors: Kenta Yamamoto, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 22 days.

(21) Appl. No.: 16/373,190

(22) Filed: Apr. 2, 2019

(65) Prior Publication Data

US 2019/0310602 A1  Oct. 10, 2019

(30) Foreign Application Priority Data

Apr. 6, 2018 (JP) .................. 2018-073721

(51) Int. Cl.
*G05B 19/18* (2006.01)
(52) U.S. Cl.
CPC .. *G05B 19/186* (2013.01); *G05B 2219/36198* (2013.01); *G05B 2219/49314* (2013.01)
(58) Field of Classification Search
CPC .............................. G05B 19/186; G05B 19/19
See application file for complete search history.

(56) References Cited

U.S. PATENT DOCUMENTS

2008/0232916 A1* 9/2008 Schiemann ............ B23G 1/225
409/66
2018/0281090 A1* 10/2018 Watanabe ............ G05B 19/186

FOREIGN PATENT DOCUMENTS

| EP | 3 241 637 A1 | 11/2017 |
| JP | 2015-225518 A | 12/2015 |
| JP | 5851670 B1 | 2/2016 |
| JP | 5902753 B2 | 4/2016 |
| WO | 2016/056526 A1 | 4/2016 |
| WO | 2019/012937 A1 | 1/2019 |

OTHER PUBLICATIONS

Office Action issued in JP 2018-073721; mailed by the Japanese Patent Office dated Mar. 31, 2020.

* cited by examiner

*Primary Examiner* — Mark A Connolly
(74) *Attorney, Agent, or Firm* — Studebaker & Brackett PC

(57) ABSTRACT

To provide a numerical controller for a machine tool capable of shredding chips efficiently along one path by making oscillating motion involving synchronization between multiple axes and intermittently making cutting-out motion and cutting-in motion. A controller is for a machine tool used for thread cutting of a work as a target of the thread cutting using multiple axes, comprising: a movement command generation unit that generates a movement command for the multiple axes; an oscillation command generation unit that generates an oscillation command for causing a work rotary axis, a tool feed axis, and a radial direction motion axis to make oscillating motion involving synchronization between these three axes, the oscillation command being for causing a cutting tool to make motion of departing from the work while making cutting-out motion on the work and make cutting-in motion on the work intermittently; and an adder that adds the movement command and the oscillation command and outputs a total movement command resulting from the addition.

6 Claims, 6 Drawing Sheets

CONTROLLER FOR MACHINE TOOL

This application is based on and claims the benefit of priority from Japanese Patent Application No. 2018-073721, filed on 6 Apr. 2018, the content of which is incorporated herein by reference.

BACKGROUND OF THE INVENTION

Field of the Invention

The present invention relates to a controller for a machine tool used for thread cutting by means of coordinated motion of multiple axes during the thread cutting. The present invention particularly relates to a controller for a machine tool capable of shredding chips occurring during thread cutting efficiently.

Related Art

Figure 5:
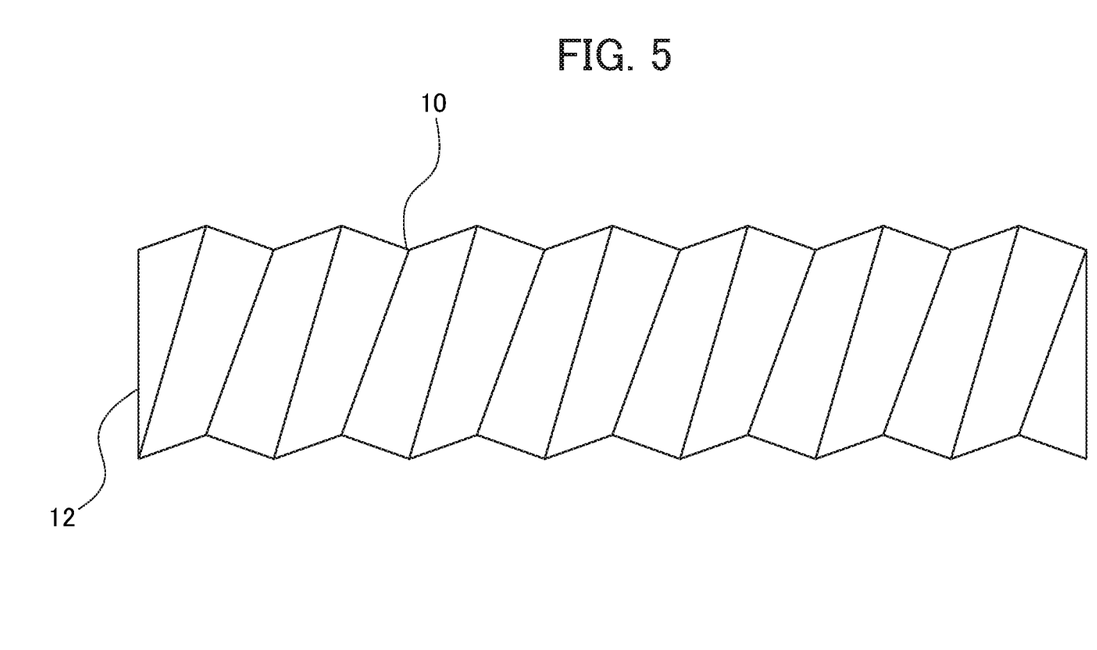
FIG. 5 shows the appearance of a screw formed by thread cutting.

Conventionally, thread cutting has been performed in various methods. In many cases, a machine tool including multiple axes has been used for thread cutting by means of coordinated motion of the multiple axes, for example. Such thread cutting is realized by lathe-turning machining of a surface of a circular cylindrical work in a spiral pattern. This lathe-turning machining is repeated on the surface of the circular cylindrical work. By doing so, a thread groove 10 having a sufficient depth is finally formed as shown in FIG. 5 to finish machining of a screw 12 as a whole.

Figure 6:
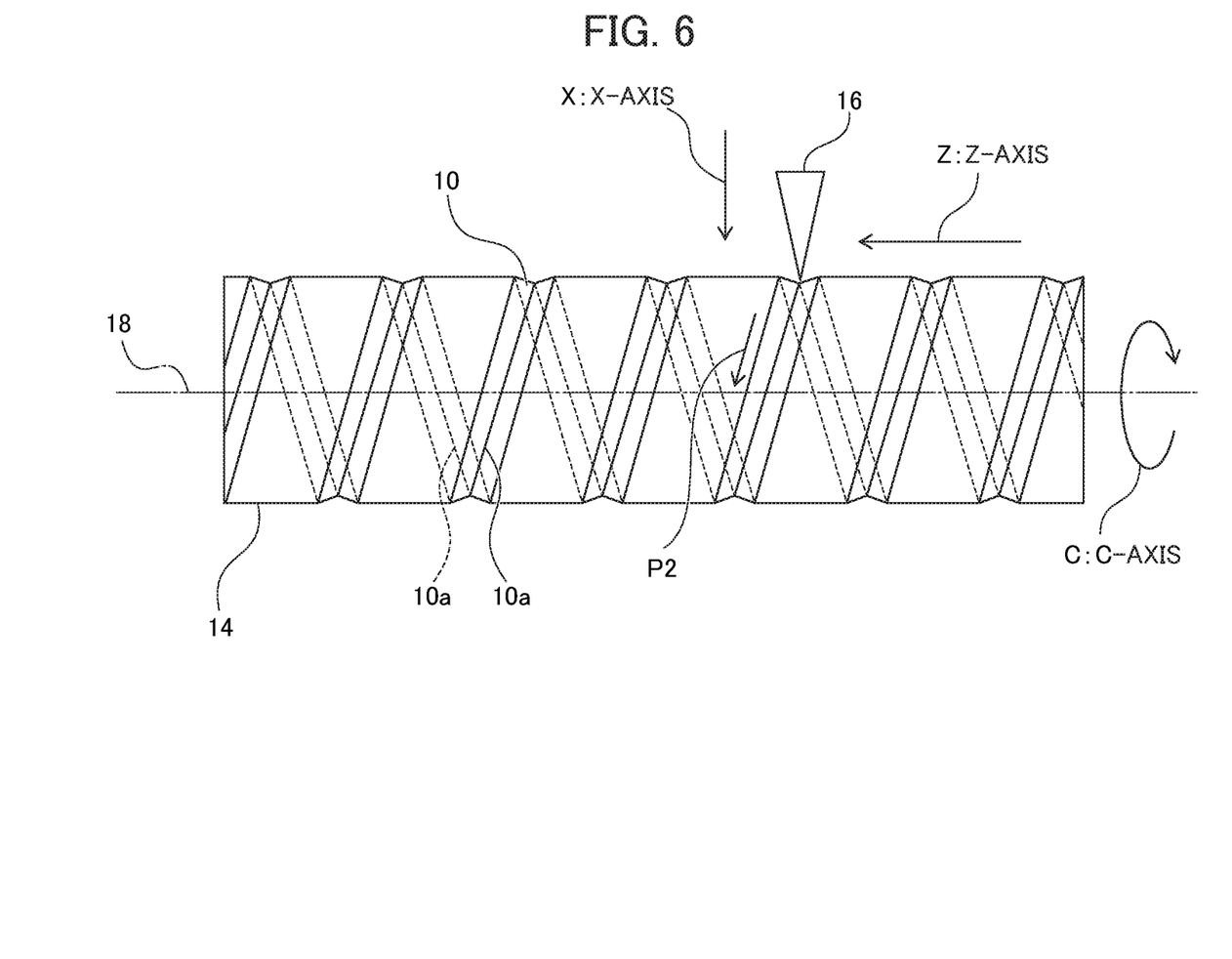
FIG. 6 shows a state when the thread cutting is being performed for forming the screw.

FIG. 6 shows a state when the lathe-turning machining is being performed. As shown in FIG. 6, the thread groove 10 is cut into a work 14 by cutting with a cutting tool 16 several times along a predetermined path 10a (position of the thread groove 10) on the work 14. FIG. 6 shows a state immediately after the start, of the cutting where the thread groove 10 is shallow. By repeating the cutting many times, the thread groove 10 is formed into a great depth (see FIG. 5) to finish formation of the screw 12 as a finished part. As shown in FIG. 6, the path 10a also exists on the back side of the work 14. In FIG. 6, for the nature of the path 10a, the path 10a is drawn as the same line as the thread groove 10 for the sake of convenience.

In FIG. 6, the work 14 is attached to a spindle axis 18 and rotates. The work 14 rotates in a manner indicated by a circular arrow C drawn as an arrow surrounding the spindle axis 18. A rotating coordinate axis indicated by the arrow C is called a C-axis. In other words, the C-axis corresponds to angular coordinates indicating an angle about the spindle axis.

The cutting tool 16 moves along the path 10a on the surface of the rotating work 14 for machining the thread groove 10 by cutting. To achieve this, the cutting tool 16 is required to move along a Z-axis (see FIG. 6) as a coordinate axis extending in the lengthwise direction of the work 14 in synchronization with the rotation of the work 14 in the C-axis direction. An arrow Z indicates the direction of a Z coordinate axis (hereinafter called the Z-axis).

By such move of the cutting tool 16 in the Z-axis direction, the thread groove 10 having what is called a spiral pattern is cut to form the screw 12, as indicated by P2 in FIG. 6. If the cutting tool 16 moves fast in the Z-axis direction, the thread groove 10 follows a steeper spiral pattern. If the cutting tool 16 moves slowly in the Z-axis direction, the thread groove 10 follows a gentler spiral pattern.

As described above, cutting is performed several times. At first, the thread groove 10 is formed into a shallow depth. After repeating the cutting many times, the thread groove 10 is formed into a greater depth. More specifically, the cutting tool 16 is controlled in such a manner that, as a result of each cutting, the cutting tool 16 gradually moves in the direction of an X coordinate axis (see FIG. 6) perpendicular to the surface of the work 14 for cutting of the work 14 at a gradually deepened position. An arrow X indicates the direction of the X coordinate axis (hereinafter called an X-axis). As a result of such control, formation of the screw 12 shown in FIG. 5 is finally finished.

In the foregoing thread cutting, chips are also required to be shredded properly. To achieve this, various techniques have been suggested. For example, patent document 1 discloses a numerical controller having a function of inserting cutting-out motion, cutting-in motion, or circular motion. The numerical controller described in patent document 1 is expected to analyze a condition for motion designated in a program such as cutting-out motion or cutting-in motion and insert the cutting-out motion or the cutting-in motion into lathe-turning machining based on a result of the analysis. This numerical controller is further expected to analyze a condition for circular motion designated in the program and insert the circular motion into the lathe-turning machining based on a result of the analysis. Patent document 1 states that, as a result, a numerical controller that makes a machine tool perform lathe-turning machining allowing fragmentation of chips is realized.

Patent document 2 discloses a technique relating to a device for thread cutting by means of a cutting-in process performed several times. According to this technique, vibration is superimposed on the movement of a driving axis to determine different vibration phase shift amounts between the cutting-in processes. Patent document 2 states that this device allows fragmentation of chips with vibration by adjusting a vibration phase properly in each cutting-in process.

Patent document 3 discloses a technique by which a cutting-in process is performed by vibrating a blade relatively toward a radial direction of a work, and a part to be machined by this cutting-in process partially covers a machined part resulting from a different cutting-in process. Patent document 3 states that, with this configuration, chips occurring during cutting are fragmented.

Patent Document 1: Japanese Patent No. 5902753 Patent Document 2: Japanese Patent No. 5851670 Patent Document 3: PCT International Publication No. WO2016/056526

SUMMARY OF THE INVENTION

The foregoing technique of patent document 1 allows insertion of motion such as cutting-out motion or cutting-in motion. However, these motions are to be made by a cutting tool and a process synchronized with motion by a work is not performed. More specifically, according to patent document 1, regarding insertion of the foregoing motion, a condition for the motion is analyzed, and the probability of insertion of the motion is determined. However, this process (vibration) is not synchronized with a process of thread cutting involving motion by the work.

The foregoing technique disclosed in patent document 2 includes the technique of adjusting the phase of oscillation (vibration). However, like in patent document 1, this oscillation (vibration) is not synchronized with a process of thread cutting involving motion by a work.

Patent document 3 mentioned above describes vibration of a cutting tool toward a radial direction of a work.

However, this vibration is not synchronized with thread cutting involving motion by the work.

As described above, the conventional oscillating machining is not synchronized completely with thread cutting. Hence, in principle, it is difficult to shred chips efficiently along one path.

The present invention has been made in view of the foregoing circumstances. The present invention is intended to provide a numerical controller for a machine tool capable of shredding chips efficiently along one path by making oscillating motion involving synchronization between multiple axes and intermittently making cutting-out motion and cutting-in motion.

From the foregoing viewpoint, the present inventors have found that, in order to shred chips occurring during thread cutting, causing three axes including at least a work rotary axis, a tool feed axis, and a tool radial direction motion axis to make oscillating motion involving synchronization between these axes makes it possible to generate oscillation that matches the thread cutting. By doing so, the chips can be shredded efficiently along one path. More specifically, the present invention employs the following means.

(1) The present invention provides a controller (controller 100 described later, for example) for a machine tool used for thread cutting of a work (work 214 described later, for example) as a target of the thread cutting using multiple axes, comprising: a movement command generation unit (movement command generation unit 104 described later, for example) that generates a movement command for the multiple axes; an oscillation command generation unit (arc command generation unit 102 described later, for example) that generates an oscillation command for causing three axes including at least a work rotary axis (spindle axis 218 described later, for example), a tool feed axis (Z-axis described later, for example), and a radial direction motion axis (X-axis described later, for example) to make oscillating motion involving synchronization between the three axes including at least the work rotary axis, the tool feed axis, and the radial direction motion axis, the oscillation command being for causing a cutting tool (cutting tool 216 described later, for example) for the thread cutting of the work to make motion of departing from the work while making cutting-out motion on the work and make cutting-in motion on the work intermittently; and an adder (adder 106 described later, for example) that adds the movement command and the oscillation command and outputs a total movement command (speed command described later, for example) resulting from the addition, wherein the total movement command is output to the machine tool.

(2) In the controller for the machine tool described in (1), the oscillating motion may be arc motion, and the oscillation command may be an arc command.

(3) In the controller for the machine tool described in (1) or (2), the oscillation command generation unit may generate the oscillation command for making the intermittent motions at a predetermined cycle.

(4) In the controller for the machine tool described in (3), the predetermined cycle may be synchronized with the work rotary axis.

(5) In the controller for the machine tool described in (3), the predetermined cycle may be a set optional temporal cycle.

(6) in the controller for the machine tool described in (3), the predetermined cycle may be defined by an external signal.

According to the present invention, chips can be shredded efficiently along one path by making oscillating motion during thread cutting.

DETAILED DESCRIPTION OF THE INVENTION

An embodiment of the present invention will be described below based on the drawings.

Figure 1:
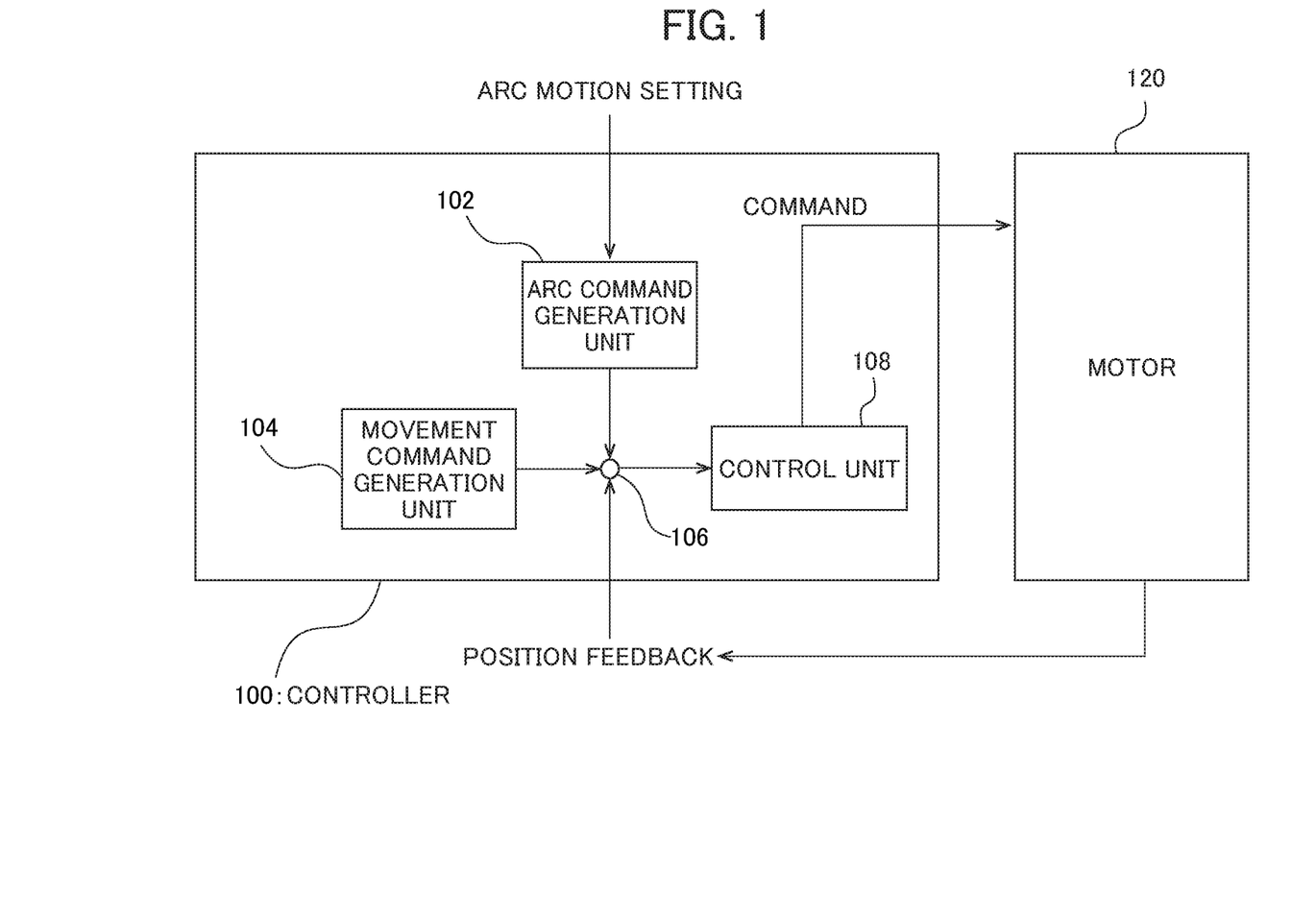
FIG. 1 is a functional block diagram showing the configuration of a controller 100 of an embodiment.

FIG. 1 is a functional block diagram showing the configuration of a controller 100 for a machine tool according to the embodiment. As shown in FIG. 1, the controller 100 includes an arc command generation unit 102, a movement command generation unit 104, an adder 106, and a control unit 108. These structures of the controller 100 may be configured using programs describing the respective motions of these structures and a CPU to execute these programs. The controller 100 may be configured as a computer. A CPU in this computer may execute programs describing the respective functions of the structures of the controller 100 to realize the structures.

The arc command generation unit 102 receives arc motion setting from outside to generate an oscillation command to be added to a movement command. The arc motion setting is data containing setting of arc motion in the oscillation command to be given to the controller 100 by an operator. For example, the arc motion setting may be data about the arc motion setting input by the operator through a keyboard or a touch panel. This arc motion setting may be parameters including the frequency (cycle) of an arc constituting oscillation, the amplitude of each axis, etc. After receiving these parameters, the arc command generation unit 102 generates an oscillation command (arc command) for arc motion based on the received parameters. The arc motion mentioned herein may be motion along a circular arc or may include an elliptical arc.

The arc command generation unit 102 can be configured using a program describing the foregoing motion, a CPU to execute the program, and an input interface (keyboard, for example) for input of the arc motion setting.

The embodiment is characterized in that oscillating motion in an oscillation command can be given as a command for arc motion. Thus, this oscillation command will be called an arc command for the sake of convenience. To generate an oscillation command as an arc command, this oscillation command is preferably given as a command for oscillation involving synchronization between multiple axes. By generating such oscillation involving synchronization between the axes, resultant total oscillation can be oscillation following an arc-like pattern, for example. By doing so, the oscillation command can function as the arc command. Specific oscillating motion made in response to the oscillation command as the arc command will be described in detail later.

The movement command generation unit 104 generates a movement command for each axis for thread cutting of a work, for example. Such generation of a movement command for each axis based on a predetermined machining program has also been done by a conventional controller. For example, a movement command for each axis for thread cutting has already been described by referring to FIG. 6.

The adder 106 adds the foregoing movement command and arc command (oscillation command), and subtracts a position feedback value from a result of the addition. The calculated positional deviation is output to a motor 120. Adding the arc command to the movement command makes it possible to apply oscillation to motion by each axis. Further, subtracting the position feedback value can realize what is called position feedback control.

The control unit 108 generates a command for driving the motor 120 in response to the input positional deviation and outputs the generated command to the motor 120. Based on this command, the motor 120 for a cutting tool is driven to move the cutting tool relative to the work.

This command (for each axis) is supplied to the motor 120. Each axis of the machine tool makes motion such as that described by referring to FIG. 6 to perform thread cutting. The embodiment is characterized in that, in this thread cutting, an oscillation command is applied as an arc command to each axis. In the embodiment, the oscillation commands for the axes are synchronized to become the arc command.

Figure 2:
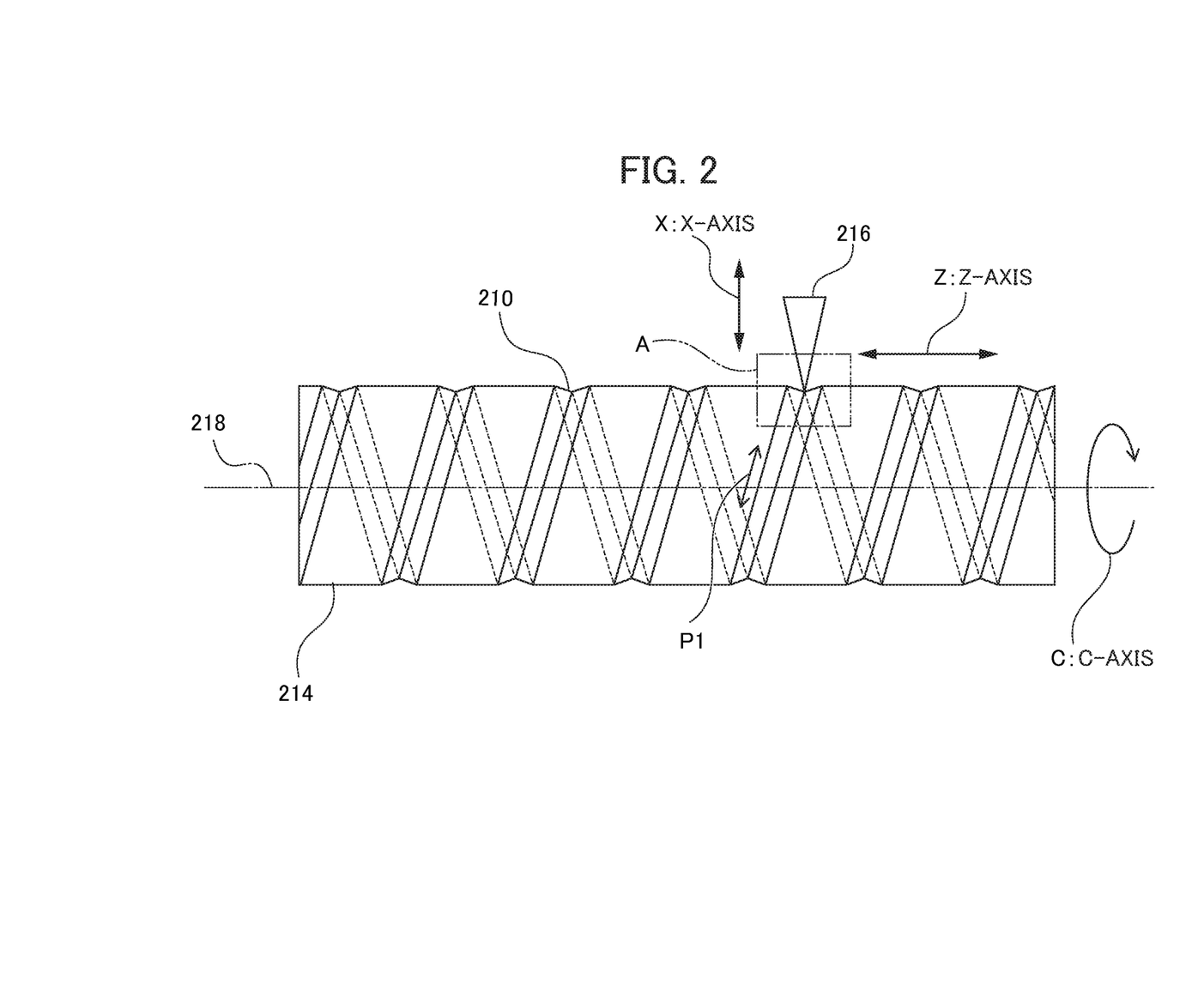
FIG. 2 shows oscillating motion (arc motion) involving synchronization between axes caused to be made by the controller 100 of the embodiment.

FIG. 2 shows motion responsive to the arc command forming the characteristic matter of the embodiment. Like FIG. 6, FIG. 2 shows a state when thread cutting is being performed. As lathe-turning machining proceeds, formation of the screw 12 shown in FIG. 5 is finally finished. As shown in FIG. 2, in the thread cutting of the embodiment, a work 214 is also attached to a spindle axis 218 and rotates. The coordinates of this rotation are indicated as a C-axis. Like in FIG. 6, an arrow C of FIG. 2 shows this C-axis and, the C-axis corresponds to angular coordinates indicating a rotation angle.

An axis parallel to the lengthwise direction of the work 214 is a Z-axis. An arrow Z of FIG. 2 shows this Z-axis. A cutting tool 216 moves along the Z-axis. By doing so, a spiral thread groove 210 is cut gradually into a surface of the work 214. At this time, a speed command output from the controller 100 is to make motion along the C-axis and motion along the Z-axis in synchronization with each other so that the thread groove 210 can be cut into a spiral pattern. One of the characteristics of the embodiment is that oscillation along the C-axis and oscillation along the Z-axis are synchronized with each other. This makes it possible to apply oscillation along the thread groove 210 cut using the cutting tool 216 in response to the speed command, as indicated by P1 in FIG. 2. As a result, chips can be shredded along the thread groove 210.

In some conventional cases, oscillation is applied independently to each axis. In such cases, the oscillation is not always applied along the thread groove 210, causing a likelihood that chips will not be shredded efficiently. By contrast, in the embodiment, oscillation along the C-axis and oscillation along the Z-axis are synchronized with each other. These oscillating motions can become oscillation along the thread groove 210 to allow efficient shredding of chips. As described above, in the embodiment, the arc command generation unit 102 generates an arc command involving synchronization between the axes. This allows the cutting tool 216 to make motion of departing from the work 214 while making cutting-out motion on the work 214 and make cutting-in motion on the work 214 intermittently. This achieves more efficient shredding of chips.

Figure 3:
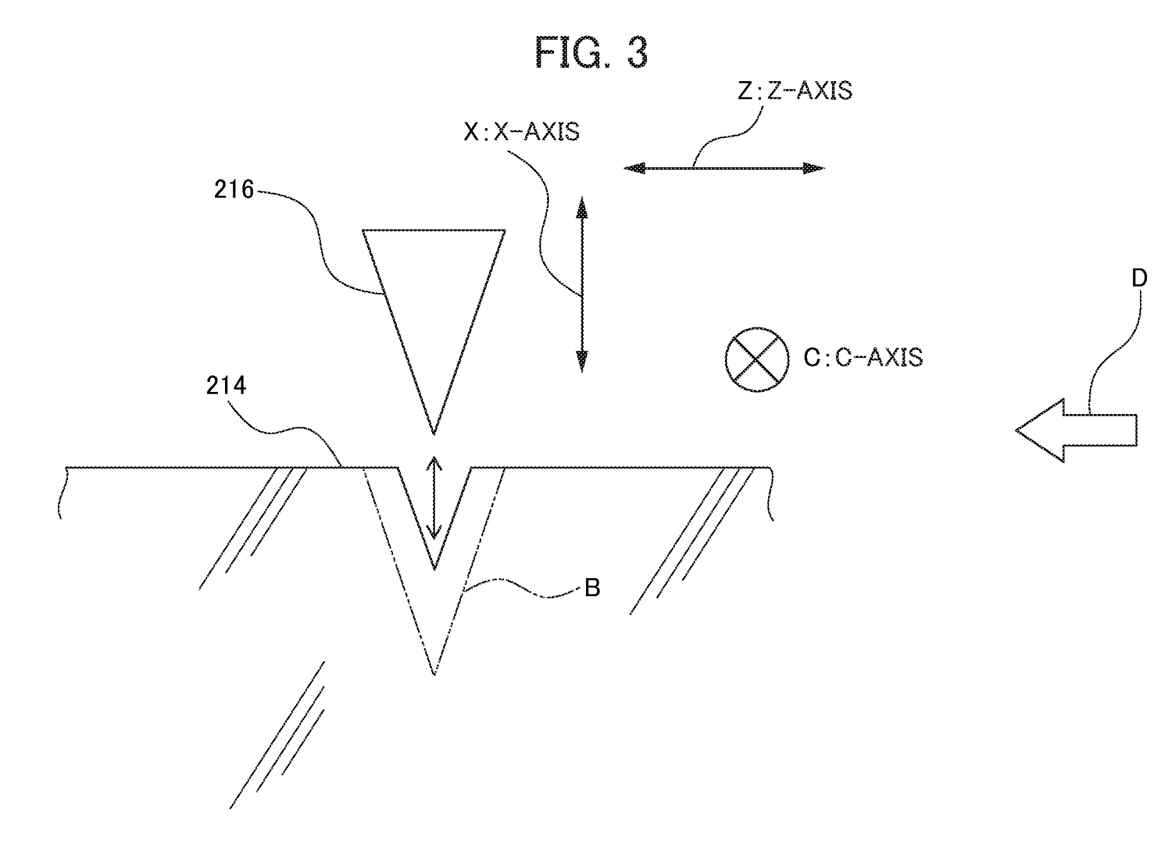
FIG. 3 is an enlarged view of an area A of FIG. 2.

FIG. 3 is an enlarged view of an area A at a tip portion of the cutting tool 216. In the area A, the C-axis is a coordinate axis extending in a direction substantially perpendicular to the drawing. The X-axis and the Z-axis extend in their directions similar to those of FIG. 2. As shown in FIG. 3, in response to a speed command for the X-axis, the cutting tool 216 further makes motion along the X-axis. This motion is synchronized with motion along the C-axis and motion along the Z-axis to realize thread cutting, as has already been described by referring to FIG. 6, etc. Each time the work 214 is cut with the cutting tool 216, the cutting tool 216 moves in a depth direction of the X-axis direction to cut the thread groove 210 gradually more deeply. The thread groove 210 is shallow in the state of FIG. 3. As the cutting proceeds, the thread groove 210 becomes deeper and deeper to be finally cut into a depth indicated by B. In FIGS. 2 and 3, an arrow X indicates the X-axis. Oscillation in the X-axis direction is generated by cutting-in and cutting-out. The cutting-in means oscillation is applied in a direction in which the cutting tool 216 gets closer to the work 214. The cutting-out means oscillation is applied in a direction in which the cutting tool 216 gets farther away from the work 214. Intermittently making the cutting-out motion and the cutting-in motion in this way allows shredding of chips occurring from the work 214.

The embodiment is characterized in that oscillation that involves synchronization between the C-axis and the Z-axis, and further with the X-axis is used. As a result of this synchronization, it becomes possible to lift the cutting tool 216 and then make cutting-in motion again with the cutting tool 216 from a previous position. This allows efficient shredding of chips.

As described above, in the embodiment, cutting-out motion and cutting-in motion are made intermittently by oscillating motion involving synchronization between the foregoing three axes. The axes mentioned herein may be various types of axes. For example, the axes may include work rotary axis (the spindle axis of the embodiment corresponds to a preferred example of the work rotary axis) or a tool feed axis (the Z-axis of the embodiment corresponds to a preferred example of the tool feed axis). Further, one of the axes to be used may be an axis for oscillation involving synchronization with radial direction motion (motion in the X-axis direction of the embodiment corresponds to a preferred example of radial direction motion).

Figure 4:
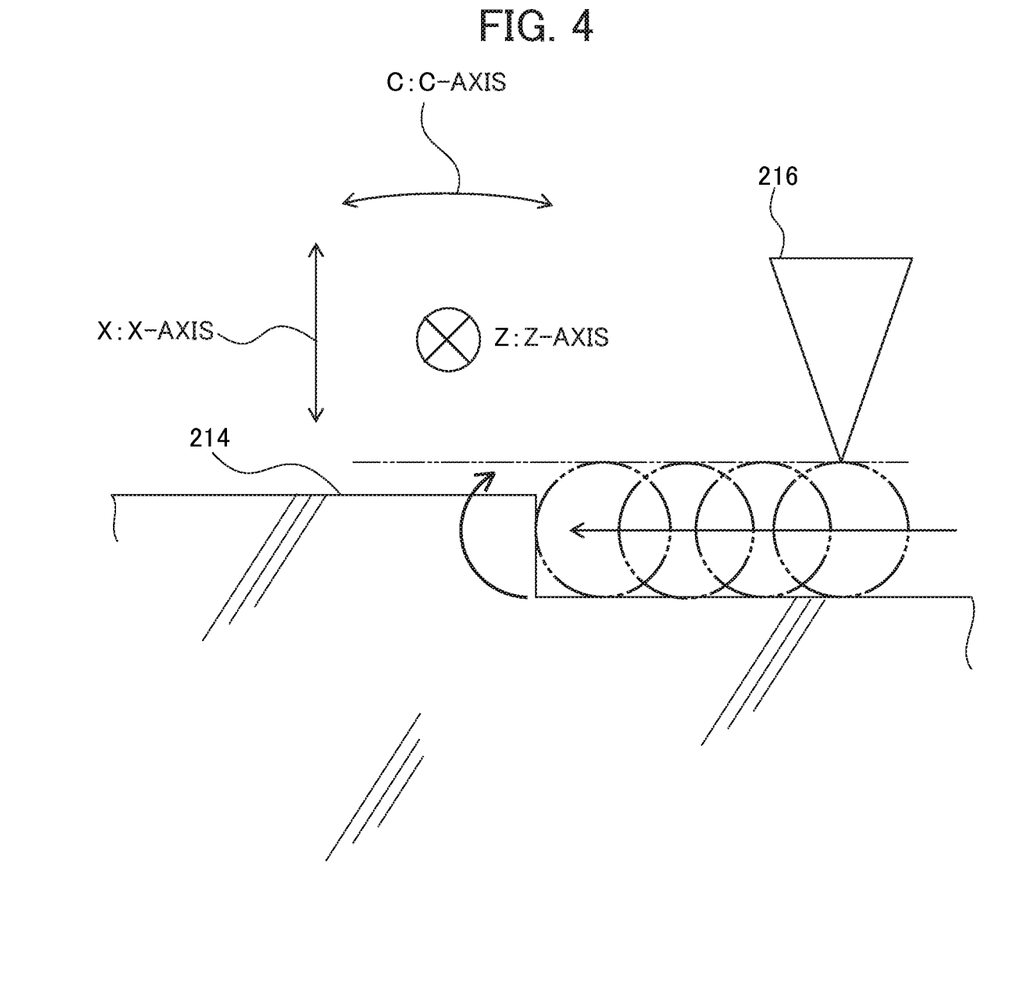
FIG. 4 shows the oscillating motion (arc motion) involving the synchronization between the axes viewed from an arrow D of FIG. 3.

FIG. 4 shows a view taken from the direction of an arrow D of FIG. 3. As this view is taken from the arrow D, the Z-axis is an axis extending in a direction perpendicular to the drawing instead of the C-axis. The C-axis is a rotating coordinate axis, so it should correctly be a coordinate axis extending in an arc-like pattern. However, in a narrow range such as the area A of FIG. 2, the C-axis can be approximated to substantially linear coordinates, as shown in FIG. 4.

As shown in FIG. 4, oscillating motion on the C-axis and oscillating motion on the X-axis of the embodiment are synchronized with each other. By doing so, as shown in FIG. 4, the tip portion of the cutting tool 216 moves in the C-axis direction and the Z-axis direction while making oscillating motion in an arc-like pattern for cutting of the work 214. As a result, the cutting tool 216 becomes capable of departing from the work 214 to allow shredding (also called fragmentation) of chips. In FIG. 4, motion with the tip of the cutting tool 216 is drawn conceptually as a circle. Meanwhile, the cutting tool 216 proceeds in a machining direction while rotating in an arc-like pattern, so that the cutting tool 216 actually follows a more complicated path.

As described above, the embodiment is characterized in that oscillations at least along the three axes (X-axis, Z-axis, and C-axis) are synchronized with each other. This achieves a first result that the cutting tool 216 is allowed to make motion in an arc-like pattern to be allowed to depart from the work 214. A second result is that a direction of machining on a work (thread cutting, for example) and a direction of oscillation can match each other, so that the oscillation can be generated along the thread groove 210, for example.

Thus, machining, or what is called finishing, becomes unnecessary in some cases. This allows so-called one-path machining to achieve a process unlikely to be influenced by various machining conditions. By eliminating the need of what is called finishing, it becomes possible to realize a more efficient machining process. Referring to the foregoing technique of patent document 2, for example, this technique always requires finishing (machining process that is not oscillation) as a final process. Thus, the embodiment can contribute to the shortening of machining time.

In the embodiment, to establish synchronization between oscillations, oscillation frequencies at the corresponding axes are required to match each other. This match between the frequencies (cycles) achieves synchronization. If the amplitudes or phases of oscillation waveforms at the corresponding axes differ from each other, an arc followed by the cutting tool 216 generally becomes an elliptical arc. Adjusting the amplitudes or phases of the oscillations at the corresponding axes makes it possible to make the cutting tool 216 follow various types of arcs. In the embodiment, these oscillations are synchronized with each other at least at the three axes to allow generation of oscillation along a machining direction.

As described above, in the embodiment, the cutting tool 216 can make motion of departing from the work 214 while making cutting-out motion on the work 214 and make cutting-in motion on the work 214 intermittently. A cycle of these intermittent motions can be determined in various ways. For example, a cycle of the intermittent motions can be a cycle synchronized with a work rotary axis such as the spindle axis 218. As another example, this cycle can be an optional temporal cycle set in advance. As a different example, this cycle may be a cycle defined by an external signal. In this case, the external signal may be a clock signal indicating the cycle, or the external signal may be supplied as data indicating the cycle.

While the embodiment of the present invention has been described in detail above, the foregoing embodiment merely shows specific examples in implementing the present invention. The technical scope of the present invention should not be limited to the foregoing embodiment. Various changes are applicable to the present invention within a range not deviating from the substance of the invention. All those changes are also included within the technical scope of the present invention.

In the example described in the foregoing embodiment, for example, the spindle axis 218 is an axis about which the work 214 rotates. Alternatively, the spindle axis may be configured as an axis about which the cutting tool 216 rotates. In this case, a similar process may also be performed using the rotation of the spindle axis. More specifically, the spindle axis may function not only as a work rotary axis but also as a tool rotary axis.

In the foregoing embodiment, three axes are synchronized with each other. However, four or more axes may be synchronized with each other. The foregoing embodiment has been described with the assumption that oscillation assumes a sine wave, for example. Meanwhile, any waveform is applicable as long as it is a cyclic waveform and a frequency (cycle) can be defined in this waveform. For example, the present invention is applicable to a case where a waveform is a rectangular wave or a triangular wave. In such cases, a pattern to be followed by the tip of the cutting tool 216 is not always a circle or an arc but may be a triangle or a rectangle.

EXPLANATION OF REFERENCE NUMERALS

10, 10a, 10b, 210 Thread groove
12 Screw
14, 214 Work
16, 216 Cutting tool
18, 218 Spindle axis
100 Controller
102 Arc command generation unit
104 Movement command generation unit
106 Adder
108 Control unit
120 motor
A Area
B Thread groove (finished state)
C C-axis
D Arrow
X X-axis
Z Z-axis

What is claimed is:

1. A controller for a machine tool used for thread cutting of a work as a target of the thread cutting using multiple axes, comprising:
   a movement command generation unit that generates a movement command for the multiple axes;
   an oscillation command generation unit that generates an oscillation command for causing all three axes including at least a work rotary axis, a tool feed axis, and a radial direction motion axis to make oscillating motions involving synchronization between all the three axes including at least the work rotary axis, the tool feed axis, and the radial direction motion axis, the oscillation command being for causing a cutting tool for the thread cutting of the work to make motions of departing from the work while making cutting-out motions on the work and make cutting-in motions on the work intermittently; and
   an adder that adds the movement command and the oscillation command and outputs a total movement command resulting from the addition, wherein
   the total movement command is output to the machine tool.

2. The controller for the machine tool according to claim 1, wherein the oscillating motions are arc motions, and the oscillation command is an arc command.

3. The controller for the machine tool according to claim 1, wherein the oscillation command generation unit generates the oscillation command for making the intermittent motions at a predetermined cycle.

4. The controller for the machine tool according to claim 3, wherein the predetermined cycle is synchronized with the work rotary axis.

5. A controller for a machine tool used for thread cutting of a work as a target of the thread cutting using multiple axes, comprising:
- a movement command generation unit that generates a movement command for the multiple axes;
- an oscillation command generation unit that generates an oscillation command for causing all three axes including at least a work rotary axis, a tool feed axis, and a radial direction motion axis to make oscillating motions involving synchronization between all the three axes including at least the work rotary axis, the tool feed axis, and the radial direction motion axis, the oscillation command being for causing a cutting tool for the thread cutting of the work to make motions of departing from the work while making cutting-out motions on the work and make cutting-in motions on the work intermittently; and
- an adder that adds the movement command and the oscillation command and outputs a total movement command resulting from the addition, wherein
- the total movement command is output to the machine tool,
- the oscillation command generation unit generates the oscillation command for making the intermittent motions at a predetermined cycle, and
- the predetermined cycle is a set optional temporal cycle.

6. A controller for a machine tool used for thread cutting of a work as a target of the thread cutting using multiple axes, comprising:
- a movement command generation unit that generates a movement command for the multiple axes;
- an oscillation command generation unit that generates an oscillation command for causing all three axes including at least a work rotary axis, a tool feed axis, and a radial direction motion axis to make oscillating motions involving synchronization between all the three axes including at least the work rotary axis, the tool feed axis, and the radial direction motion axis, the oscillation command being for causing a cutting tool for the thread cutting of the work to make motions of departing from the work while making cutting-out motions on the work and make cutting-in motions on the work intermittently; and
- an adder that adds the movement command and the oscillation command and outputs a total movement command resulting from the addition, wherein
- the total movement command is output to the machine tool,
- the oscillation command generation unit generates the oscillation command for making the intermittent motions at a predetermined cycle, and
- the predetermined cycle is defined by an external signal.

* * * * *